(12) United States Patent
Reed et al.

(10) Patent No.: US 11,903,344 B2
(45) Date of Patent: Feb. 20, 2024

(54) SYSTEM AND METHOD FOR CONTROLLING UNLOADING SYSTEM POSITION OF AN AGRICULTURAL HARVESTER

(71) Applicant: CNH Industrial America LLC, New Holland, PA (US)

(72) Inventors: Daniel Reed, Brownstown, PA (US); Paul Deysher, Reinholds, PA (US)

(73) Assignee: CNH Industrial America LLC, New Holland, PA (US)

( * ) Notice: Subject to any disclaimer, the term of this patent is extended or adjusted under 35 U.S.C. 154(b) by 5 days.

(21) Appl. No.: 17/527,242

(22) Filed: Nov. 16, 2021

(65) Prior Publication Data

US 2023/0148475 A1    May 18, 2023

(51) Int. Cl.
*A01D 90/10*    (2006.01)

(52) U.S. Cl.
CPC .................... *A01D 90/10* (2013.01)

(58) Field of Classification Search
CPC ......... A01D 90/10; A01D 90/12; B65G 67/24
See application file for complete search history.

(56) References Cited

U.S. PATENT DOCUMENTS

| | | | |
|---|---|---|---|
| 6,681,551 B1 | 1/2004 | Sheidler et al. | |
| 6,682,416 B2 * | 1/2004 | Behnke | A01D 43/073 460/119 |
| 8,398,469 B2 | 3/2013 | Coers et al. | |
| 8,909,389 B2 * | 12/2014 | Meyer | A01D 43/085 701/2 |
| 9,002,591 B2 | 4/2015 | Wang et al. | |
| 9,119,342 B2 | 9/2015 | Bonefas | |
| 9,313,951 B2 * | 4/2016 | Herman | B60R 1/00 |
| 9,332,692 B2 * | 5/2016 | Krause | A01D 43/07 |
| 11,399,462 B2 * | 8/2022 | Suleman | A01D 90/10 |

(Continued)

FOREIGN PATENT DOCUMENTS

| | | | | |
|---|---|---|---|---|
| EP | 2923560 A1 * | 9/2015 | ............. | A01D 90/10 |
| EP | 3939408 A1 * | 1/2022 | ........... | A01D 41/127 |

(Continued)

OTHER PUBLICATIONS

Partial International Search Report and Written Opinion for Application No. PCT/US2022/049834 dated Feb. 24, 2023 (7 pages).

*Primary Examiner* — Kaitlin S Joerger
(74) *Attorney, Agent, or Firm* — Peter K. Zacharias

(57) ABSTRACT

A system for controlling an unloading system of an agricultural harvester includes a frame. A crop unloading system includes an unloading tube operably coupled to the frame and a spout operably coupled with the unloading tube. The crop unloading system is configured to discharge harvested crop from the agricultural harvester. A computing system is communicatively coupled to a user interface and the crop unloading system. The computing system is configured to store a predetermined unloading position based on a defined location of the unloading tube and a defined location of the spout received through one or more inputs. When an input is actuated for a minimum threshold, the computing system controls an operation of one or more actuators such that the unloading system is moved relative to the frame from a current position to the predetermined unloading position.

17 Claims, 9 Drawing Sheets

(56) References Cited

U.S. PATENT DOCUMENTS

| | | | |
|---|---|---|---|
| 11,467,605 B2 * | 10/2022 | Palla | A01B 69/004 |
| 11,477,940 B2 * | 10/2022 | Palla | A01M 21/043 |
| 2009/0044505 A1 * | 2/2009 | Huster | A01D 43/087 56/10.2 R |
| 2010/0063692 A1 * | 3/2010 | Madsen | A01D 43/073 348/46 |
| 2010/0108188 A1 * | 5/2010 | Correns | A01D 43/087 141/83 |
| 2010/0266377 A1 * | 10/2010 | Yoder | A01D 41/1217 414/519 |
| 2011/0061762 A1 * | 3/2011 | Madsen | B65G 67/32 141/94 |
| 2012/0215394 A1 * | 8/2012 | Wang | A01D 41/1278 701/50 |
| 2012/0302299 A1 * | 11/2012 | Behnke | A01B 69/008 701/50 |
| 2013/0096782 A1 | 4/2013 | Good et al. | |
| 2015/0327425 A1 * | 11/2015 | Dillon | A01B 69/001 701/41 |
| 2016/0150733 A1 * | 6/2016 | Missotten | G06T 7/13 701/50 |
| 2016/0192590 A1 * | 7/2016 | Byttebier | A01D 90/10 701/50 |
| 2016/0249533 A1 * | 9/2016 | Byttebier | A01D 90/10 701/50 |
| 2016/0270294 A1 * | 9/2016 | Viaene | A01D 43/073 |
| 2016/0302360 A1 * | 10/2016 | Depestel | A01D 75/187 |
| 2017/0276534 A1 * | 9/2017 | Vermue | G01F 23/292 |
| 2018/0310475 A1 | 11/2018 | Biggerstaff et al. | |
| 2019/0322461 A1 * | 10/2019 | Banthia | B65G 67/24 |
| 2020/0137957 A1 * | 5/2020 | Friesen | A01D 90/10 |
| 2020/0214210 A1 | 7/2020 | Bonefas | |
| 2021/0195840 A1 * | 7/2021 | Puryk | A01D 41/127 |
| 2022/0197302 A1 * | 6/2022 | McClelland | A01D 90/10 |

FOREIGN PATENT DOCUMENTS

| | | | | |
|---|---|---|---|---|
| JP | 11127681 A | 5/1999 | | |
| JP | 4058205 B2 | 3/2008 | | |
| JP | 4367171 B2 | 11/2009 | | |
| WO | WO-2011101458 A1 * | 8/2011 | | A01D 41/1217 |
| WO | WO-2015032809 A1 * | 3/2015 | | A01D 41/1272 |
| WO | WO-2015063107 A1 * | 5/2015 | | A01D 43/073 |

* cited by examiner

SYSTEM AND METHOD FOR CONTROLLING UNLOADING SYSTEM POSITION OF AN AGRICULTURAL HARVESTER

FIELD

The present disclosure generally relates to agricultural harvesters and, more particularly, to systems and methods for controlling the position of an unloading tube of an agricultural harvester.

BACKGROUND

An agricultural harvester is a machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this respect, harvesters are typically equipped with a detachable harvesting implement, such as a header, which cuts and collects the crop from the field. The harvester also includes a crop processing system, which performs various processing operations (e.g., threshing, separating, etc.) on the harvested crop received from the harvesting implement. Furthermore, the harvester includes a crop tank, which receives and stores the harvested crop after processing.

In certain instances, the stored harvested crop is unloaded from the harvester into a nearby crop receiving vehicle. To this end, the harvester generally includes an unloading tube through which the processed crops are conveyed from the crop tank to an offboard location. During the unload process, the unloading tube may be moved to an unloading position to allow the harvested crop to be deposited into a crop receiving chamber of the crop receiving vehicle. In this respect, systems have been developed for controlling the position of the unloading tube. While these systems work well, further improvements are needed.

Accordingly, an improved system and method for controlling the unloading position of an agricultural harvester would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for controlling an unloading system of an agricultural harvester. The system includes a frame. A crop unloading system includes an unloading tube operably coupled to the frame and a spout operably coupled with the unloading tube. The crop unloading system is configured to discharge harvested crop from the agricultural harvester. One or more actuators is configured to move the crop unloading system relative to the frame. A user interface is configured to receive one or more inputs. A computing system is communicatively coupled to the user interface and the crop unloading system. The computing system is configured to store a predetermined unloading position based on a defined location of the unloading tube received through the one or more inputs and a defined location of the spout received through the one or more inputs. When an input is actuated for a minimum threshold, the computing system is further configured to control an operation of the one or more actuators such that the unloading system is moved relative to the frame from a current position to the predetermined unloading position.

In some aspects, the present subject matter is directed to a method for controlling an unloading system of an agricultural harvester. The agricultural harvester includes a frame, an unloading tube configured to move relative to the frame, and a spout configured to move relative to the unloading tube. The method includes receiving, through a user interface, a defined location of the unloading tube relative to the frame based on one or more inputs. The method also includes storing, with a computing system, the defined location of the unloading tube. The method further includes receiving, through the user interface, a defined location of the spout relative to the unloading tube based on one or more inputs. In addition, the method includes storing, with the computing system, the defined location of the spout, wherein the stored defined location of the unloading tube and the stored defined location of the spout define a predetermined unloading position. Lastly, the method includes unloading, with the computing system, at least a portion of a harvested crop from a crop tank through the unloading system after each of the unloading tube and the spout are moved to the predetermined unloading position.

In some aspects, the present subject matter is directed to a method for controlling an unloading system of an agricultural harvester. The agricultural harvester includes a frame, an unloading tube configured to move relative to the frame, and a spout configured to move relative to the unloading tube. The method includes presenting an exterior image on a touchscreen. The method also includes receiving, through a first user input indicating a first area on the touchscreen. The method further includes correlating the first area on the touchscreen with a coordinate system applied to the image. In addition, the method includes setting a first input location as a defined unloading tube location. Further, the method includes receiving a second user input indicating a second area on the touchscreen. The method also includes correlating the second area on the touchscreen with the coordinate system applied to the image. The method includes setting a second input location as a defined spout location. Lastly, the method includes storing the defined unloading tube location and the defined spout location as a predetermined unloading position.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
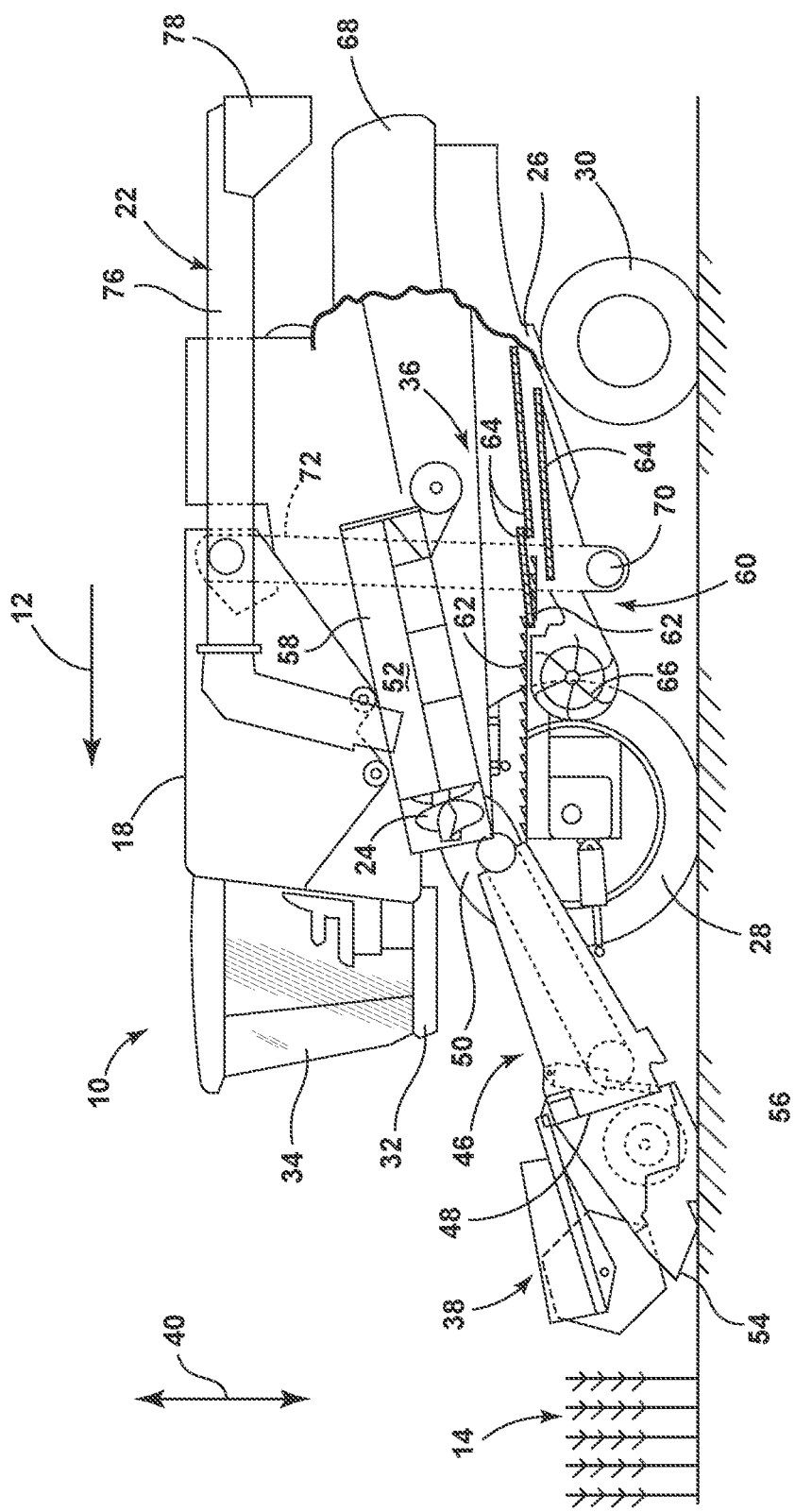
FIG. 1 illustrates a side plan view of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for controlling the unloading position of an agricultural harvester. The agricultural harvester can include a frame. A crop unloading system includes an unloading tube operably coupled to the frame and a spout operably coupled with the unloading tube. The crop unloading system is configured to discharge harvested crop from the agricultural harvester. In various embodiments, one or more actuators is configured to move the crop unloading system relative to the frame.

A user interface may be configured to receive one or more inputs. A computing system can be communicatively coupled to the user interface and the crop unloading system. The computing system can be configured to store a predetermined unloading position based on a defined location of the unloading tube received through the one or more inputs and a defined location of the spout received through the one or more inputs. When an input is actuated for a minimum threshold, the computing system may control an operation of the one or more actuators such that the unloading system is moved relative to the frame from a current position to the predetermined unloading position.

Figure 2:
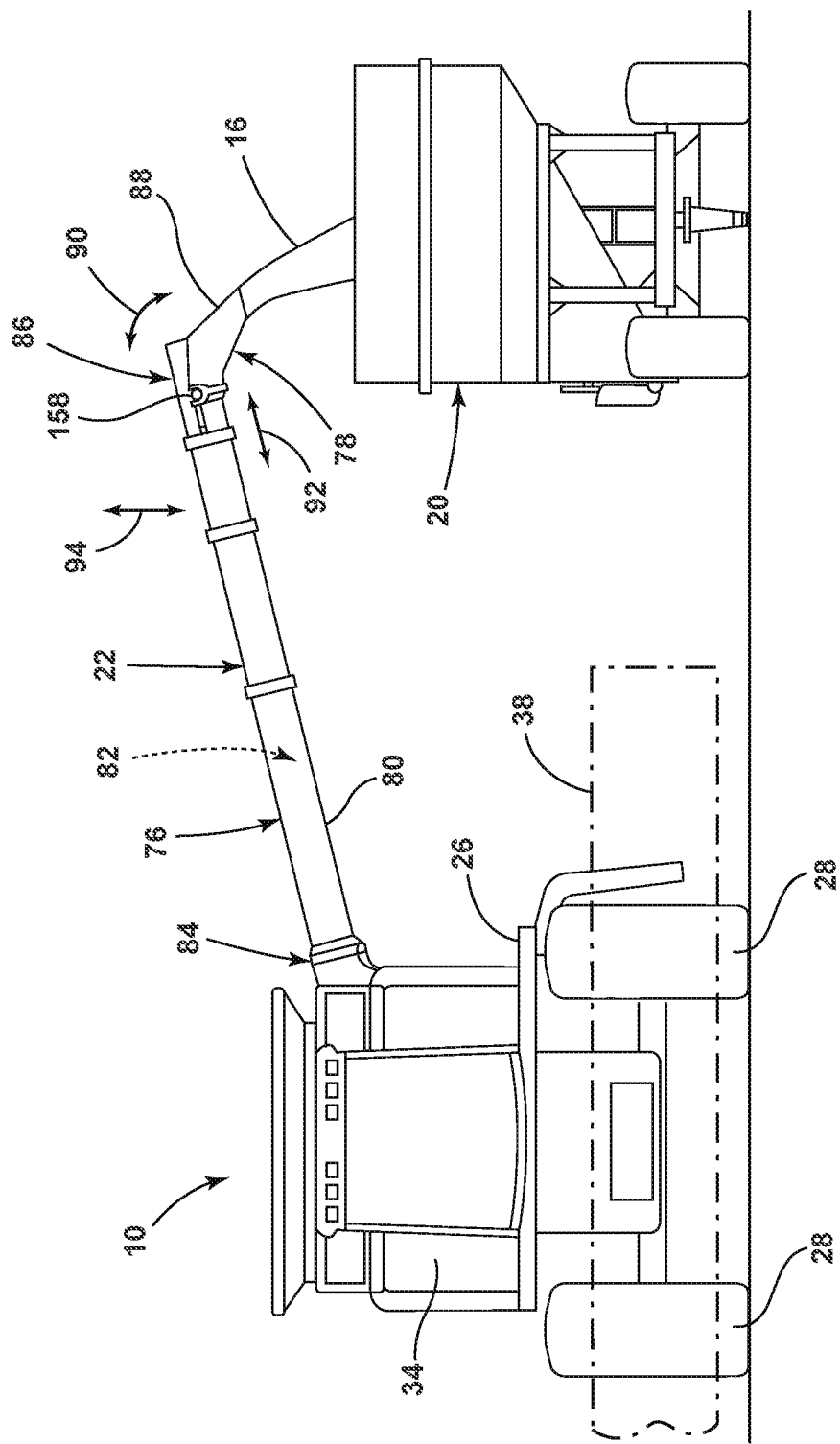
FIG. 2 illustrates a front plan view of the agricultural harvester in accordance with aspects of the present subject matter.

Referring now to the drawings, FIGS. 1 and 2 respectively illustrate a partial sectional side view of an agricultural harvester 10 and a front perspective view of the harvester 10 unloading a harvested crop 16 into a crop receiving vehicle 20 in accordance with aspects of the present subject matter. In general, the harvester 10 is configured to travel across a field in a direction of travel (indicated by arrow 12) to harvest a standing crop 14. While traversing the field, the harvester 10 may be configured to process a harvested crop 16 and store the harvested crop 16 within a crop tank 18 of the harvester 10. Furthermore, the harvested crop 16 may be unloaded from the crop tank 18 for receipt by the crop receiving vehicle 20 via a crop unloading system 22 of the harvester 10.

As shown in FIG. 1, the harvester 10 is configured as an axial-flow type combine in which the harvested crop 16 is threshed and separated while being advanced by and along a longitudinally arranged rotor 24. However, in alternative embodiments, the harvester 10 may have any other suitable harvester configuration.

The harvester 10 includes a chassis or frame 26 configured to support and/or couple to various components of the harvester 10. For example, in several embodiments, the harvester 10 may include a pair of driven, ground-engaging front wheels 28 and a pair of steerable rear wheels 30 coupled to the frame 26. As such, the wheels 28, 30 support the harvester 10 relative to the ground and move the harvester 10 in the direction of travel 12. Furthermore, the harvester 10 may include a user's platform 32 having a user's cab 34, a crop processing system 36, the crop tank 18, and the crop unloading system 22 that are supported by the frame 26. As will be described below, the crop processing system 36 may be configured to perform various processing operations on the harvested crop 16 as the crop processing system 36 operates to transfer the harvested crop 16 between a harvesting implement 38 (e.g., header) of the harvester 10 and the crop tank 18.

Moreover, as shown in FIG. 1, the harvesting implement 38 and an associated feeder 46 of the crop processing system 36 extend forward of the frame 26 and are pivotably secured thereto for movement in a vertical direction (indicated by arrow 40). In general, the feeder 46 supports the harvesting implement 38. As shown in FIG. 1, the feeder 46 may extend between a front end portion 48 coupled to the harvesting implement 38 and a rear end portion 50 positioned adjacent to a threshing and separating assembly 52 of the crop processing system 36. For instance, the rear end portion 50 of the feeder 46 may be pivotably coupled to a portion of the harvester 10 to allow the front end portion 48 of the feeder 46. Thus, the harvesting implement 38 can be moved upward and downward relative to the ground along the vertical direction 40 to set the desired harvesting or cutting height for the harvesting implement 38.

As the harvester 10 is propelled forwardly over the field with the standing crop 14, the crop material can be severed from the stubble by a sickle bar 54 at the front portion of the harvesting implement 38 and delivered by a harvesting implement auger 56 to the front end portion 48 of the feeder 46. The feeder 46, in turn, supplies the harvested crop 16 to the threshing and separating assembly 52. In several embodiments, the threshing and separating assembly 52 may include a cylindrical chamber 58 in which the rotor 24 is rotated to thresh and separate the harvested crop 16 received therein. That is, the harvested crop 16 is rubbed and beaten between the rotor 24 and the inner surfaces of the chamber 58, whereby the grain, seed, or the like, is loosened and separated from the straw.

The harvested crop 16 that has been separated by the threshing and separating assembly 52 may fall onto a crop cleaning assembly 60 of the crop processing system 36. In general, the crop cleaning assembly 60 may include a series of pans 62 and associated sieves 64. As such, the separated harvested crop 16 may be spread out via oscillation of the pans 62 and/or sieves 64 and may eventually fall through apertures defined in the sieves 64. Additionally, a cleaning fan 66 may be positioned adjacent to one or more of the sieves 64 to provide an air flow through the sieves 64 that remove chaff and other impurities from the harvested crop 16. For instance, the fan 66 may blow the impurities off the harvested crop 16 for discharge from the harvester 10 through the outlet of a straw hood 68 positioned at the back end of the harvester 10. The cleaned harvested crop 16 passing through the sieves 64 may then fall into a trough of an auger 70, which may transfer the harvested crop 16 to an elevator 72 for delivery to the crop tank 18.

Referring further to FIGS. 1 and 2, the unloading system 22 is operable to unload a harvested crop 16 into a receiving container, such as the crop receiving vehicle 20. The unloading system 22 generally includes an unloading tube assembly 76 and a spout assembly 78. The unloading assembly 76 may include an unloading tube 80 and one or more transfer components 82 that may assist with moving the harvested crop 16 through the unloading tube 80. The unloading tube 80 has an intake end portion 84 and a discharge end portion 86, which generally discharges the harvested crop 16 therefrom. The spout assembly 78 can be positioned proximate to the discharge end portion 86 of the unloading tube 80 can include a spout 88 that can be connected to the discharge end portion 86 and movable relative to the unloading tube 80. In the illustrated embodiment, the spout 88 is pivotally movable relative to discharge end portion 86 of the unloading tube 80 (e.g., as indicated by arrow 90). However, the spout 88 can also be movable in different directions relative to discharge end portion 86 of the unloading tube 80, such as being movable in a translational direction (e.g., as indicated by arrows 92, 94) or rotational direction.

Figure 3:
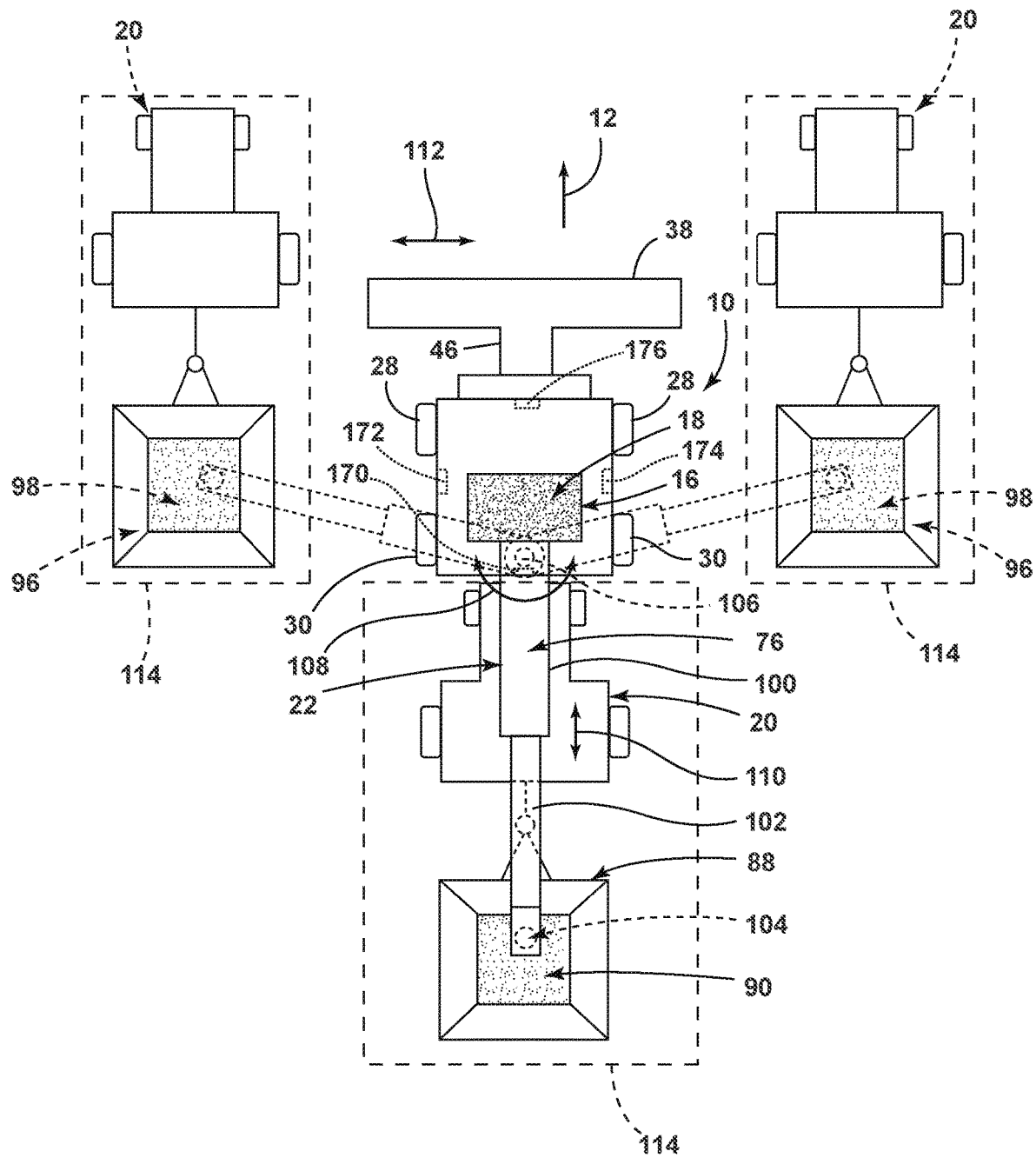
FIG. 3 illustrates a top schematic view of an agricultural harvester unloading harvested crop into a crop receiving vehicle in accordance with aspects of the present subject matter.

Referring now to FIG. 3, a top view of the harvester 10 unloading harvested crop 16 into the associated crop receiving vehicle 20 is illustrated in accordance with aspects of the present disclosure. As shown, in some embodiments, the crop receiving vehicle 20 may be configured as an agricultural tractor. In such an embodiment, the crop receiving vehicle 20 may include a crop cart 96 defining a crop receiving chamber 98 configured to receive the harvested crop 16 discharged from the crop unloading system 22 of the harvester 10. However, in other embodiments, the crop receiving vehicle 20 may be configured as any other suitable vehicle capable of receiving harvested crop 16 discharged by the crop unloading system 22.

In general, the crop unloading system 22 is configured to move relative to the frame 26 of the harvester 10 to allow the harvested crop 16 to be discharged into the crop receiving chamber 98. For example, in several embodiments, the intake end portion 84 of the unloading tube 80 can be pivotably coupled to the frame 26 of the harvester 10 and a discharge end portion 86 from which the harvested crop 16 is discharged. In various embodiments, the unloading tube 80 may include a first tube section 100 positioned at its intake end portion 84 and pivotably coupled to the frame 26. Moreover, the unloading tube 80 may include a second tube section 102 translationally coupled to the first tube section 100. In some instances, the unloading tube 80 may include a discharge opening 104 through which the harvested crop 16 is discharged from the unloading tube 80. In this respect, the unloading tube 80 may be configured to rotate or swing relative to a pivot point or vertically extending axis 106 on the frame 26 (e.g., as indicated by arrow 108). Thus, the discharge opening 104 can be moved forward and aft relative to the frame 26 along the direction of travel 12. Moreover, the unloading tube 80 may be configured to move along the vertical direction 40 (FIG. 1) to raise and/or lower the discharge opening 104 relative to the frame 26 and/or the ground. In addition, the second tube section 102 may be extended and/or retracted relative to the first tube section 100 (e.g., as indicated by arrow 110). As such, the distance between the discharge opening 104 and the frame 26 may be adjusted.

In addition, as various embodiments, the spout 88 may be configured to rotate relative to the second tube section 102. For example, the spout 88 may be pivotally movable relative to the discharge end portion 86 of the unloading tube 80 (e.g., as indicated by arrow 90 in FIG. 2). Additionally or alternatively, the spout 88 may be translationally coupled with the unloading tube 80 and/or configured to move along the vertical direction 40 (FIG. 1) to raise and/or lower the spout 88 relative to the frame 26 and/or the ground.

In several embodiments, the unloading tube assembly 76 is moveable between a crop storage position (FIG. 1) and an unloading position (FIG. 3). For instance, as shown in FIG. 1, when at the crop storage position, the unloading tube 80 may be positioned relative to the harvester frame 26 such that its discharge end portion 86 is generally positioned aft of the frame 26. Moving the unloading tube 80 to the crop storage position makes the harvester 10 narrower in a lateral direction (indicated by arrow 112 and extending perpendicular to the direction of travel 12), thereby making it easier to navigate around obstacles (e.g., trees, building, power lines, etc.). Conversely, when at the unloading position, the discharge end portion 86 of the unloading tube 80 is positioned outward from the frame 26 in the vehicle travel direction 12 and/or the lateral direction 112 such that the discharge opening 104 is positioned at a suitable location to deposit crops into the crop receiving chamber 98 of the crop cart 96 (or another crop receiving vehicle/implement).

As will be described below, when the harvested crop 16 is to be removed from the crop tank 18, a user input may be actuated. When the user input is actuated, the crop unloading system 22 may be moved from its current position (e.g., the crop storage position shown in FIG. 1) to a predetermined unloading position (e.g., the unloading position shown in FIG. 3). In this respect, when the user input is actuated, which may be when the crop receiving vehicle 20 is present in a crop unloading zone 114, the crop unloading system 22 may position the unloading tube 80 and the spout 88 in a predefined position, which may be accomplished sequentially and/or simultaneously. For instance, the unloading tube 80 may be rotated or swung about the axis 106, raised/lowered, and/or extended/retracted to move the unloading tube 80 to the predetermined unloading position. Likewise, the spout 88 may also be rotated or swung (e.g., as indicated by arrow 90 in FIG. 2), raised/lowered, and/or extended/retracted to move the spout 88 to the predetermined unloading position.

As illustrated in FIG. 3, the crop unloading zone 114 may be one or more positions proximate to the harvester 10. The crop loading zone may be chosen based on various factors, such as the vehicles in operation, the constraints of the field, the preferences of the users, etc. Based on the crop loading zone position, a user may define the predetermined unloading position. For example, in some instances, the user may use a user interface 116 (FIG. 4) to manipulate the unloading tube 80 and/or the spout 88 to a desired location. Once the unloading tube 80 and/or the spout 88 are in their respective desired locations, the user may store the desired locations as the predetermined unloading position. In turn, each time the harvested crop 16 is to be removed from the harvester 10, the user interface 116 may be actuated to move the unloading system 22 to the predetermined unloading position. The user interface 116 provided herein may allow for a more consistent and reliable unload process, particularly in situations where the unloading of the harvested crop 16 is not easily monitored, such as when unloading rearwardly of the harvester 10.

It should be further appreciated that the configuration of the agricultural harvester 10 described above and shown in FIGS. 1-3 is provided only to place the present subject matter in an exemplary field of use. Thus, it should be appreciated that the present subject matter may be readily adaptable to any manner of harvester configuration.

Figure 4:
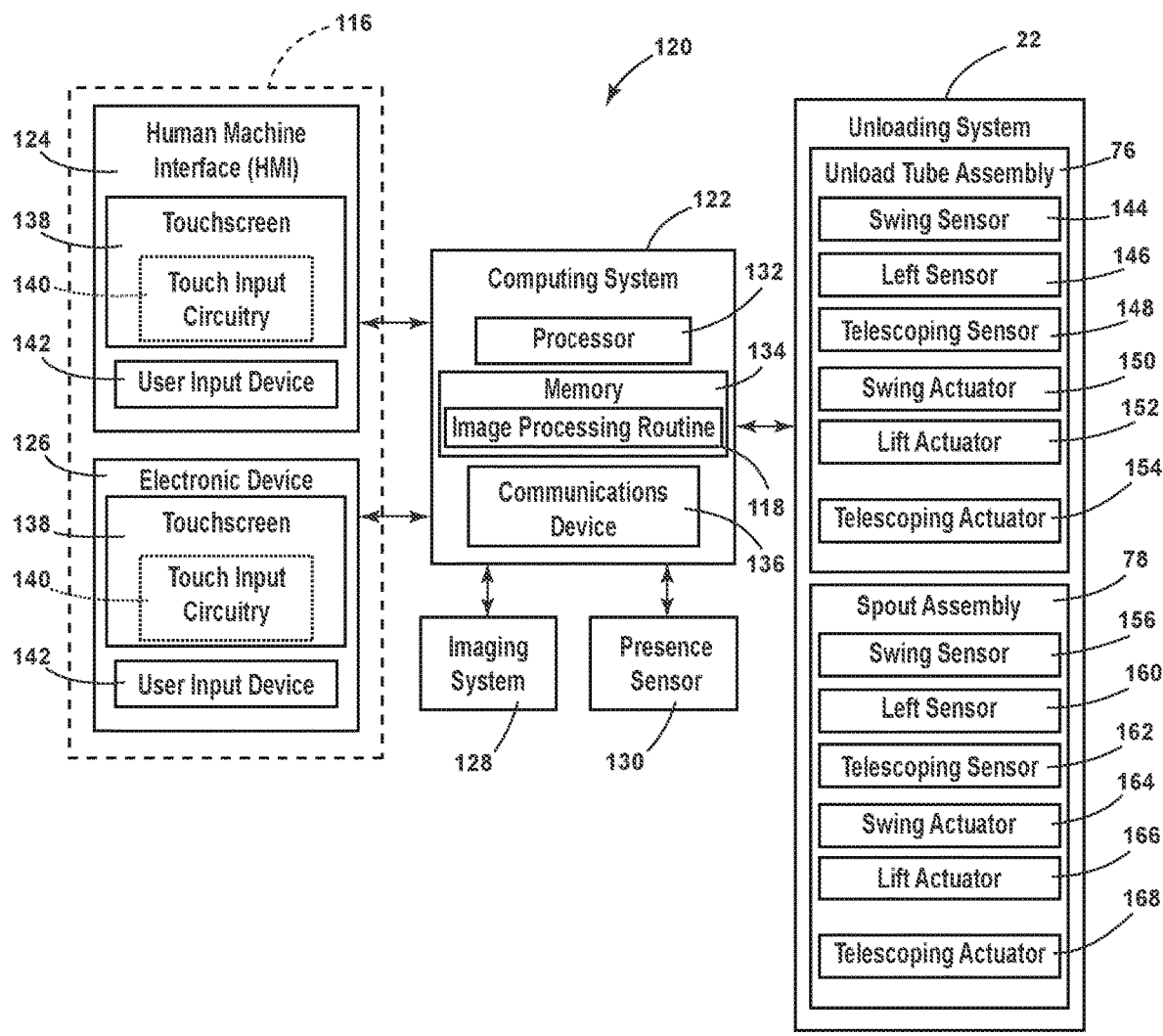
FIG. 4 illustrates a schematic view of a system for controlling the unloading position of an agricultural harvester in accordance with aspects of the present subject matter.

Referring now to FIG. 4, a schematic view of a system 120 for controlling a position of an unloading system 22 of an agricultural harvester 10 is illustrated in accordance with aspects of the present subject matter. In general, the system 120 will be described herein with reference to the agricultural harvester 10 described above with reference to FIGS. 1-3. However, it should be appreciated by those of ordinary skill in the art that the disclosed system 120 may generally be utilized with agricultural harvesters having any other suitable harvester configuration.

As shown in FIG. 4, the system 120 may include a computing system 122 operably coupled with the unloading system 22, the user interface 116, which may be in the form of a human-machine interface (HMI) 124 and/or an electronic device 126, an imaging system 128, and/or a presence sensor 130. In general, a user may input movement commands through the user interface 116. In turn, the computing system 122 may provide instructions to the unloading system 22 to manipulate the position of the unloading system 22. Once the unloading system 22 is positioned in a desired unloading position, the user may store the position as the predetermined unloading position. When the harvested crop 16 is to be removed from the harvester 10, a user input device 142 may be actuated which may move the unloading tube 80 to the stored predetermined unloading position. Once the unloading system 22 is in the predetermined unloading position, the computing system 122 may activate one or more transfer components 82 to unload at least a portion of the harvested crop 16 from the crop tank 18 through the unloading system 22. In some instances, prior to exhausting the harvested crop 16, a presence sensor 130 may confirm that an object is or is not present within an unloading zone 114.

The computing system 122 is communicatively coupled to one or more components of the harvester 10 and/or the system 120 to allow the operation of such components to be electronically or automatically controlled by the computing system 122. In general, the computing system 122 may include one or more processor-based devices, such as a given controller or computing device or any suitable combination of controllers or computing devices. Thus, in several embodiments, the computing system 122 may include one or more processors 132 and associated memory devices 134 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory devices 134 of the computing system 122 may generally include memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory devices 134 may generally be configured to store suitable computer-readable instructions that, when implemented by the processors 132, configure the computing system 122 to perform various computer-implemented functions, such as one or more aspects of the image-processing routine described herein, as well as any other methods and algorithms. In addition, the computing system 122 may also include various other suitable components, such as a communications circuit or module, one or more input/output channels, a data/control bus, and/or the like.

The various functions of the computing system 122 may be performed by a single processor-based device or may be distributed across any number of processor-based devices, in which instance such devices may be considered to form part of the computing system 122. For instance, the functions of the computing system 122 may be distributed across multiple application-specific controllers or computing devices, such as a navigation controller, an engine controller, a transmission controller, and/or the like.

In several embodiments, the computing system 122 may be configured to communicate via wired and/or wireless communication with the user interface 116, which may include the HMI 124 and/or the remote electronic device 126, through a communications device 136 (e.g., a transceiver). The communication may be one or more of various wired or wireless communication systems, including any combination of wired (e.g., cable and fiber) and/or wireless (e.g., cellular, wireless, satellite, microwave, and radio frequency) communication systems and any desired network topology (or topologies when multiple communication systems are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The HMI 124 may be configured to receive inputs (e.g., inputs associated with a desired unloading position and/or actuation of the unloading system 22) from the user. In some embodiment, the HMI 124 may be mounted or otherwise positioned within the user's cab 34 of the harvester 10. However, in alternative embodiments, the user interface 116 may be mounted at any other suitable location.

In some examples, the HMI 124 may include a touchscreen 138 capable of displaying information related to the unloading system 22 or any other information through a graphical user interface (and/or through any other manner).

In some embodiments, the HMI 124 may include a user input device 142 in the form of circuitry 140 within the touchscreen 138 to receive an input corresponding with a location over the touchscreen 138. Other forms of input, including one or more joysticks, digital input pads, or the like can be used in place or in addition to the touchscreen 138. In addition to the touchscreen 138, some embodiments of the HMI 124 may also include one or more additional feedback devices, such as speakers, warning lights, and/or the like, which are configured to provide feedback from the computing system 122 to the user.

The electronic device 126 may also include a touchscreen 138 for providing information to a user, who may be remote from the cab 34 of the harvester 10. For instance, the touchscreen 138 may include one or more graphical user interfaces and may be capable of receiving remote user inputs (e.g., inputs associated with a desired unloading position and/or actuation of the unloading system 22) from the user. It will be appreciated that the electronic device 126 may be any one of a variety of computing devices and may include a processor and memory. For example, the electronic device 126 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In some embodiments, the electronic device 126 may include a user input device 142 in the form of circuitry 140 within a touchscreen 138 to receive an input corresponding with a location over the touchscreen 138. Other forms of input, including one or more joysticks, digital input pads, or the like can be used in place or in addition to the touchscreen 138. In addition to the touchscreen 138, some embodiments of the electronic device 126 may also include one or more additional feedback devices, such as speakers, warning lights, and/or the like, which are configured to provide feedback from the computing system 122 to the user.

Furthermore, the computing system 122 may be operably coupled with the unloading system 22. The unloading system 22 may include the unloading tube 80 and the spout 88. As provided herein, the unloading tube 80 may be moveable relative to the harvester 10 in one or more directions. In addition, the spout 88 may be movable relative to the unloading tube 80. As such, the user may manipulate the unloading system 22 in a plurality of positions to accommodate for various predetermined crop unloading positions.

As illustrated, the unloading system 22 may include an unloading tube swing sensor 144. In general, the unloading tube swing sensor 144 may be configured to capture data indicative of the rotational position of the intake end portion 84 of the unloading tube 80 about the vertical axis or pivot point 90 (e.g., the swing or rotation of the unloading tube 80). In some instances, the data captured by the unloading tube swing sensor 144 may be used when moving the unloading tube 80 between the crop storage position and the predetermined unloading position(s). For example, in various embodiments, the swing sensor 144 may correspond to a rotary potentiometer operably coupled with the unloading tube 80 and the frame 26. However, in alternative embodiments, the swing sensor 144 may correspond to any other suitable sensing device configured to capture data indicative of the rotational position of the unloading tube 80.

Additionally, the unloading system 22 may include an unloading tube lift sensor 146. In general, the unloading tube lift sensor 146 may be configured to capture data indicative of the position of the discharge end portion 86 of the unloading tube 80 along the vertical direction 40. In various instances, the data captured by the unloading tube lift sensor 146 may be used when moving the unloading tube 80 between the crop storage position and the predetermined unloading position(s). For example, in some embodiments, the unloading tube lift sensor 146 may correspond to a rotary potentiometer coupled between the unloading tube 80 and the frame 26. However, in alternative embodiments, the unloading tube lift sensor 146 may correspond to any other suitable sensing device configured to capture data indicative of the vertical position of the unloading tube 80.

Moreover, the unloading system 22 may include an unloading tube lift sensor 148. In general, the unloading tube lift sensor 148 may be configured to capture data indicative of the distance between the discharge opening 104 of the unloading tube 80 and the frame 26 (e.g., the extension/retraction of the unloading tube 80). In various instances, the data captured by the lift sensor 148 may be used when moving the unloading tube 80 between the crop storage position and the predetermined unloading position(s). For example, in various embodiments, the lift sensor 148 may correspond to a linear potentiometer coupled between the first and second tube sections 100, 102. However, in alternative embodiments, the lift sensor 148 may correspond to any other suitable sensing device configured to capture data indicative of the extension/retraction of the unloading tube 76.

In addition, the unloading system 22 may include one or more actuators configured to adjust one or more degrees of the unloading tube 80. In general, by adjusting the degree(s) of freedom of the unloading tube 80, the actuator(s) may move the unloading tube 76 between the crop storage position and the predetermined unloading position(s). For example, in several embodiments, the unloading system 22 may include one or more unloading tube swing actuators 150. The actuator(s) 150 is, in turn, configured to rotate or swing the unloading tube 80 about the vertical axis or pivot point 90 to move the discharge opening 104 forward and/or aft relative to the frame 26. Additionally or alternatively, in some embodiments, the unloading system 22 may include one or more unloading tube lift actuators 152. The actuator(s) 152 is, in turn, configured to raise and/or lower the unloading tube 80 relative to the frame 26 along the vertical direction 40. Additionally or alternatively, in various embodiments, the unloading system 22 may include one or more unloading tube telescoping actuators 154. The actuator(s) 154 is, in turn, configured to extend and/or retract the second tube section 102 relative to the first tube section 100, thereby increasing or decreasing the distance between the discharge opening 104 of the unloading tube 80 and the frame 26. However, in alternative embodiments, the unloading system 22 may include other actuators in addition to and/or in lieu of the actuators 150, 152, 154.

The actuators 150, 152, 154 may correspond to any suitable actuators configured to adjust the associated degrees of freedom of the unloading tube 80. For example, in some embodiments, the actuators 150, 152, 154 may correspond to hydraulic cylinders. Additionally or alternatively, the actuators 150, 152, 154 may correspond to any suitable actuators, such as pneumatic actuators, electric linear actuators, electric motors, and/or the like.

As illustrated, the unloading system 22 may also include a spout swing sensor 156. In general, the spout swing sensor 156 may be configured to capture data indicative of the rotational position of the spout 88 about the horizontal axis or pivot point 158 (FIG. 2). In some instances, the data captured by the spout swing sensor 156 may be used when moving the spout 88 between the crop storage position and the predetermined unloading position(s). For example, in various embodiments, the swing sensor 156 may correspond to a rotary potentiometer operably coupled with the spout 88 and the unloading tube 80. However, in alternative embodiments, the spout swing sensor 156 may correspond to any other suitable sensing device configured to capture data indicative of the rotational position of the spout 88.

Additionally, the unloading system 22 may include a spout lift sensor 160. In general, the spout lift sensor 160 may be configured to capture data indicative of the position of the spout 88 along the vertical direction 40. In various instances, the data captured by the spout lift sensor 160 may be used when moving the spout 88 between the crop storage position and the predetermined unloading position(s). For example, in some embodiments, the spout lift sensor 160 may correspond to a linear potentiometer coupled between the spout 88 and the unloading tube 80. However, in alternative embodiments, the spout lift sensor 160 may correspond to any other suitable sensing device configured to capture data indicative of the vertical position of the spout 88.

Moreover, the unloading system 22 may include a spout lift sensor 162. In general, the spout lift sensor 162 may be configured to capture data indicative of the distance between the discharge opening 104 of the unloading tube 80 and the spout 88 (e.g., the extension/retraction of the spout 88). In various instances, the data captured by the spout lift sensor 162 may be used when moving the spout 88 between the crop storage position and the predetermined unloading position(s). For example, in various embodiments, the spout lift sensor 162 may correspond to a linear potentiometer coupled between the first and second tube sections 100, 102. However, in alternative embodiments, the lift sensor 162 may correspond to any other suitable sensing device configured to capture data indicative of the extension/retraction of the unloading tube 80.

In addition, the unloading system 22 may include one or more actuators configured to adjust one or more degrees of the spout 88. In general, by adjusting the degree(s) of freedom of the spout 88, the actuator(s) may move the spout 88 between the crop storage position and the predetermined unloading position(s). For example, in several embodiments, the unloading system 22 may include one or more spout swing actuators 164. The spout actuator(s) 164 is configured to rotate or swing the spout 88 about the horizontal or pivot point 158 to move the spout 88 relative to the unloading tube 80. Additionally or alternatively, in some embodiments, the unloading system 22 may include one or more spout lift actuators 166. The spout actuator(s) 166 is configured to raise and/or lower the spout 88 relative to the unloading tube 80 along the vertical direction 40. Additionally or alternatively, in various embodiments, the unloading system 22 may include one or more spout telescoping actuators 168. The spout actuator(s) 168 is configured to extend and/or retract the spout 88 relative to the unloading tube 80, thereby increasing or decreasing the distance between the discharge opening 104 of the unloading tube 80 and the spout 88. However, in alternative embodiments, the unloading system 22 may include other actuators in addition to and/or in lieu of the actuators 164, 166, 168.

The actuators 164, 166, 168 may correspond to any suitable actuators configured to adjust the associated degrees of freedom of the spout 88. For example, in some embodiments, the actuators 164, 166, 168 may correspond to hydraulic cylinders. Additionally or alternatively, the actuators 164, 166, 168 may correspond to any suitable actuators, such as pneumatic actuators, electric linear actuators, electric motors, and/or the like.

With further reference to FIG. 4, the system may further include a presence sensor 130. In general, the presence sensor 130 is configured to capture data indicative of the presence of the crop receiving vehicle 20 (or any other object) within the crop unloading zone 114 of the agricultural harvester 10. In various embodiments, the data captured by the presence sensor 130 may be analyzed to determine when the crop receiving vehicle 20 and/or another object is present within the crop unloading zone 114 of the harvester 10. In some examples, when the system receives an unload command through the user interface 116, the system may determine if the crop receiving vehicle 20 is present within the crop unloading zone 114 and/or whether any other objects are within the crop unloading zone 114. Based on the detection of crop receiving vehicle 20 and/or any other object, the unloading system 22 may place the unloading tube 80 and the spout 88 in the predetermined crop unloading position. With the unloading system 22 in the unloading position and crop receiving vehicle 20 detected, the unloading system 22 may exhaust the harvested crop 16 through the unloading system 22.

In several embodiments, the presence sensor 130 may correspond to a transceiver-based sensor. In such embodiments, the presence sensor 130 may generally correspond to any suitable sensing device configured to emit output signals for reflection off a surface (e.g., the crop receiving vehicle 20) and receive or sense the return signals. For example, in one such embodiment, the presence sensor 130 may correspond to a radio detection and ranging (RADAR) sensor or a light detection and ranging (LIDAR) sensor. Additionally or alternatively, the presence sensor 130 may correspond to any other suitable sensor or sensing device, such as an ultrasonic sensor.

With further reference to FIG. 4, the system 120 may also include an imaging system 128, which may include one or more suitable cameras (e.g., a plurality of cameras), such as single-spectrum camera or a multi-spectrum camera configured to capture images of an area surrounding the harvester 10, for example, in the visible light range and/or infrared spectral range. Additionally, in various embodiments, the cameras may correspond to a single lens camera configured to capture two-dimensional images or a stereo cameras having two or more lenses with a separate image imaging device for each lens to allow the cameras to capture stereographic or three-dimensional images. In some embodiments, the imaging system 128 can include a rearview camera 170 (FIG. 3), which is positioned and configured for capturing an image of a view beyond the rear of the harvester 10. Additionally or alternatively, the imaging system 128 may include a plurality of cameras directed outwardly from the harvester 10 from a plurality of corresponding locations that are configured to collectively capture a view surrounding at least a portion of the view. For example, the imaging system 128 may be configured as a 360-degree imaging system 128 that may include the above-mentioned rear camera 170 or an additional rear camera or cameras, as well as respective side cameras 172, 174 (FIG. 3) and/or a front-facing camera 176 (FIG. 3). The imaging system 128 may include additional cameras, as needed to provide respective portions of the desired 360-degree view surrounding the harvester 10, which may include, for example, corner cameras or additional rear, front, and/or side cameras and may depend on the particular size or configuration of the imaging. In some instances, the imaging system 128 can incorporate a generally non-visual device or apparatus that, in some instances, can be shared with or otherwise used by the system. For example, the imaging system 128 can use RADAR, LIDAR, one or more ultrasonic sensors, or combinations thereof. These systems can be used to determine the location, size, and, optionally, identifying profiles, of objects surrounding the imaging, and can, accordingly, identify the location and positioning of the unloading system 22.

Figure 5:
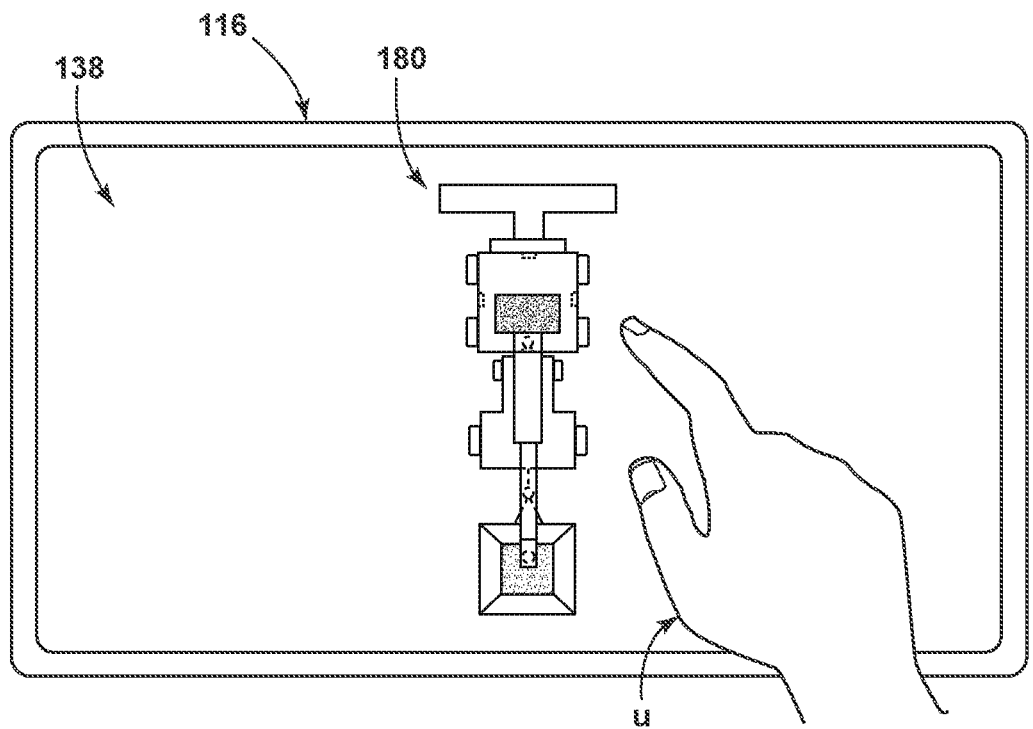
FIG. 5 illustrates an example user interface in accordance with aspects of the present subject matter.
Figure 6:
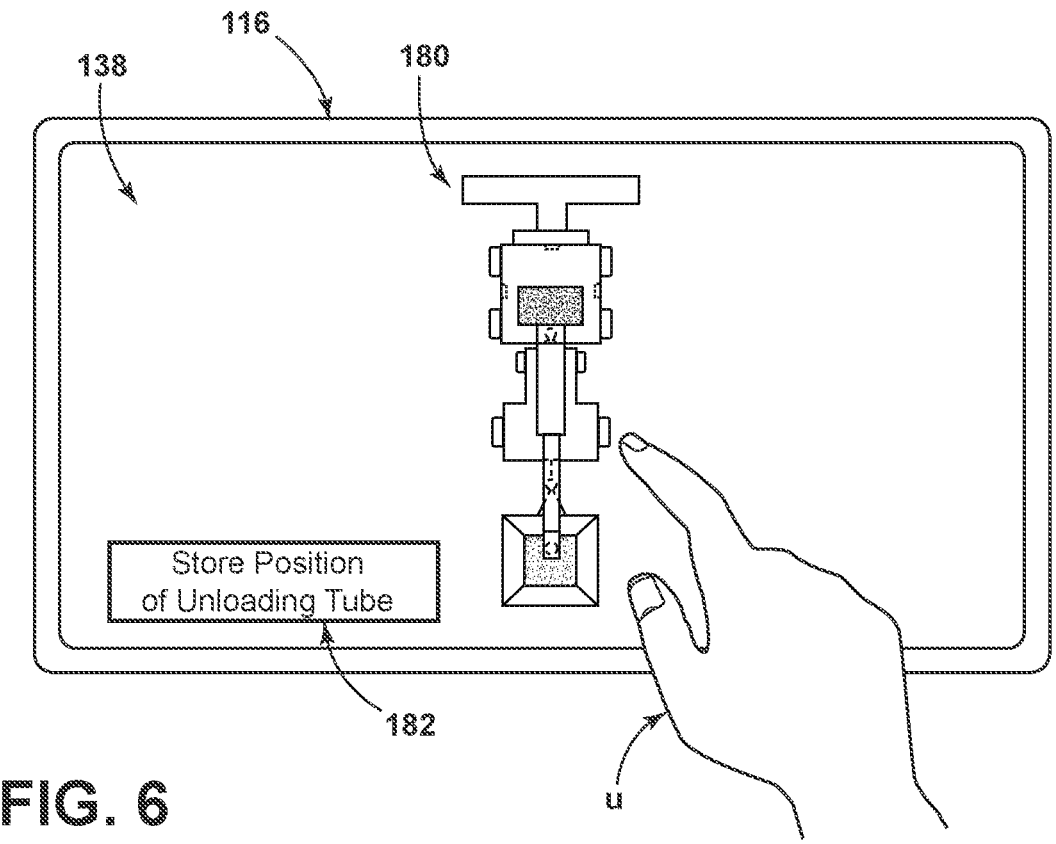
FIG. 6 illustrates an example user interface in accordance with aspects of the present subject matter.
Figure 7:
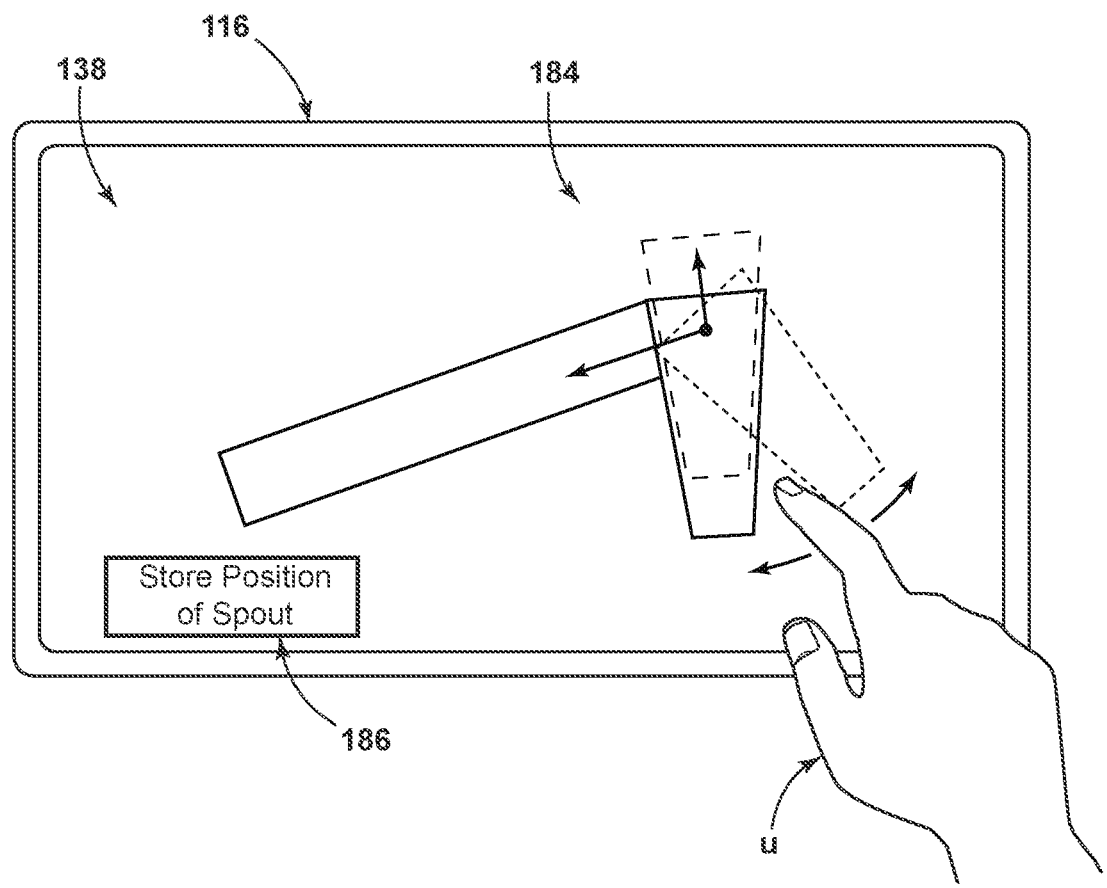
FIG. 7 illustrates an example user interface in accordance with aspects of the present subject matter.
Figure 8:
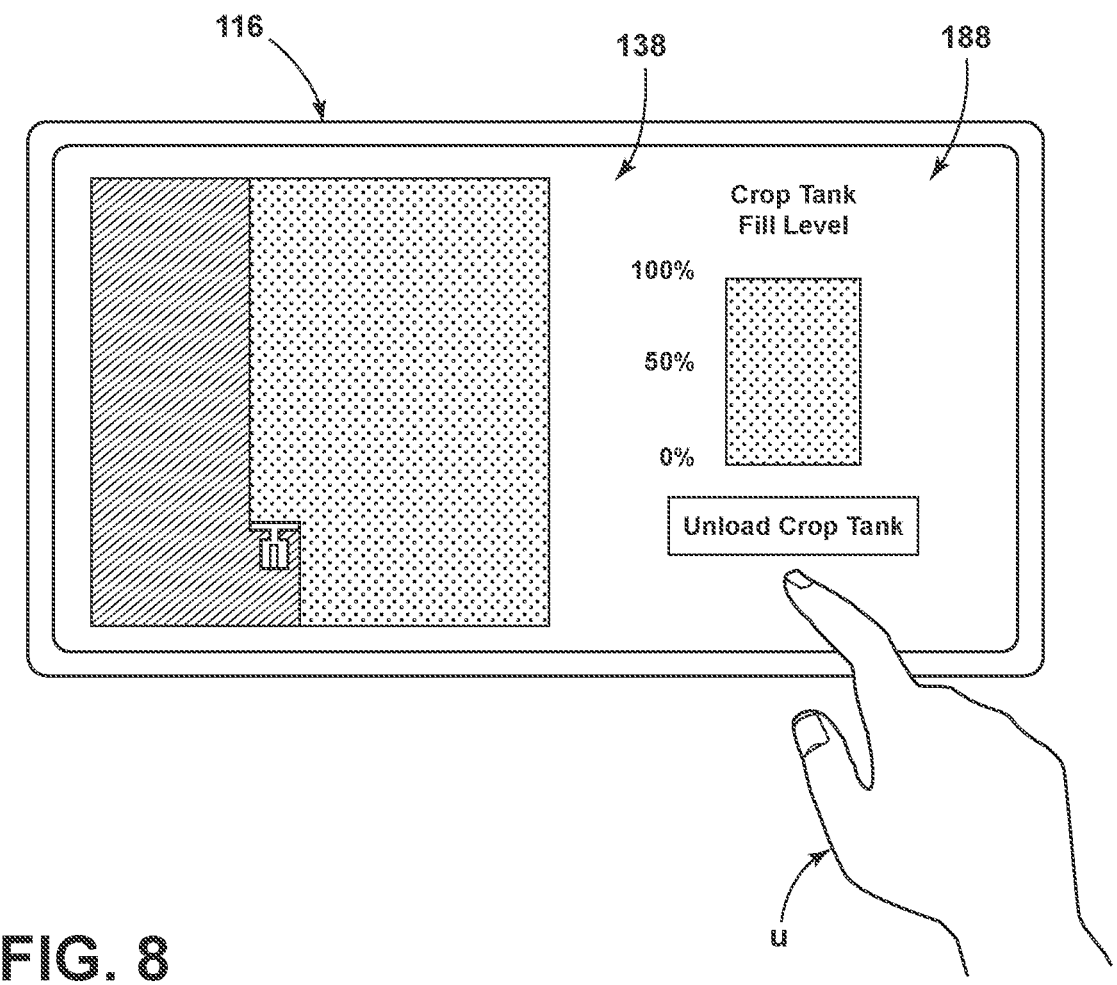
FIG. 8 illustrates an example user interface in accordance with aspects of the present subject matter.

Referring now to FIGS. 5-8, front views of a touchscreen 138 of the user interface 116 in accordance with aspects of the present disclosure. Specifically, FIGS. 5 and 6 are front views of the touchscreen 138 during a step of defining the unloading position of the unloading tube 80 in accordance with aspects of the present disclosure. FIG. 7 is a front view of the touchscreen 138 during a step of defining the unloading position of the spout 88 in accordance with aspects of the present disclosure. FIG. 8 is a front view of the touchscreen 138 during the operation of the harvester 10 in accordance with aspects of the present disclosure.

Referring further to FIGS. 5 and 6, in some embodiments, the touchscreen 138 may provide a first view 180 of the unloading system 22 and/or the harvester 10 within the field. As provided herein, the first view 180 may be a rearview, a side view, or a front view, and/or a combination thereof of the harvester 10 and/or an area surrounding the harvester 10. When the imaging system 128 is configured as the described or similar 360-degree imaging system 128, the system may utilize an image processing routine 118, which may be stored in the memory device (FIG. 4) of the computing system 122 and/or any other location, to assemble the respective images from the various cameras 170, 172, 174, 176 into an exterior image, which may be in the form of a panoramic 360-degree view, a bird's-eye view (shown in FIGS. 5 and 6), and/or any other composite image that utilizes data from one or more of the cameras. In either aspect, the image processing routine 118 may digitally stitch together the images such that the portions of the adjacent edges of the individual images align to give the appearance of a cohesive whole. Additional processing may be performed to adjust the viewpoint and/or perspective of the images to emulate a single camera. In particular, in assembling the depicted bird's-eye view, the cameras 170, 172, 174, 176 may be positioned to capture portions of the ground immediately adjacent the harvester 10 and extending outwardly therefrom, and the image processing routine 118 can adjust and crop the respective images based on known characteristics and locations of the cameras 170, 172, 174, 176 to emulate a view taken from above the harvester 10 and to interpose a digital image of the harvester 10 at the center of the depicted rearview image. Additionally or alternatively, when the imaging system 128 includes a non-visual device, the image processing routine 118 can derive an image based on the information or data received from the non-visual device to replace or emulate the overhead image depicted in FIGS. 5 and 6.

In addition to assembling the image, the image processing routine 118 can also use the known camera characteristics and positioning to apply a coordinate system to the image. As shown, the use of the bird's eye view for determination of the predetermined unloading position may also allow for such determination when the unloading position is not within the view of the rear camera alone, such as when the unloading position is positioned to the side (or in front of) the harvester 10. In this manner, the user U can visually determine the position of the unloading position within the image and can provide a touch input on the screen in such a location by touching or tapping the image on the location 28 of the unloading position therein. The image processing routine 118 can then correlate the location of the touch input with the coordinate system applied to the image. Because the coordinate system is calibrated to correspond with the real-world coordinate system surrounding the harvester 10 and employed by the positioning system, the touch input can be used by the image processing routine 118 to determine the unloading position with respect to the harvester 10.

The image processing routine 118 can optionally provide for adjustment or refinement of the determined the unloading position based on the user input. In some examples, the image processing routine 118 itself can be programmed or otherwise configured to initially interpret the location of the input received from user U as the indication of a target area within which the unloading position is located. The image processing routine 118 can then identify the actual position of the unloading tube 80 within the image. In this respect, the computing system 122 may be able to determine an unloading position within the target area to a degree greater than the resolution of the touchscreen 138, including that which the circuitry 140 may provide. Additionally, or alternatively, the computing system 122 may seek confirmation of the unloading position, determined either directly using the user input or the target area refinement, through a prompt 182 on touchscreen 138. If the location is not confirmed, further image processing may be provided, or user-adjustment of the unloading tube 80 may be facilitated, either using the touchscreen 138 or another input to allow the user to move the depicted unloading position on the touchscreen 138, which the computing system 122 may use to adjust the unloading tube 80 with respect to the harvester 10 based on the above-described use of the coordinate system.

Referring now to FIG. 7, in some embodiments, the touchscreen 138 may provide a second view 184 of the unloading system 22 and/or the harvester 10 within the field that may optionally provide for adjustment or refinement of the defined location of the spout 88 based on the user input. In some examples, the image processing routine 118 itself can be programmed or otherwise configured to initially interpret the location of the input received from user U as the indication of a target area within which the unloading position is located. The image processing routine 118 can then identify the actual position of the spout 88 within the image. In this respect, the computing system 122 may be able to determine a spout position within the target area to a degree greater than the resolution of the touchscreen 138, including that which circuitry 140 may provide. Additionally, or alternatively, the computing system 122 may seek confirmation of the spout position, determined either directly using the user input or the target area refinement, through a prompt 186 on touchscreen 138. If the location is not confirmed, further image processing may be provided, or user-adjustment of the spout 88 may be facilitated, either using the touchscreen 138 or another input to allow the user to move the depicted spout position on the touchscreen 138, which the computing system 122 may use to adjust the spout 88 with respect to the unloading tube 80 based on the above-described use of the coordinate system. As such, in some instances, the defined location of the unloading tube 80 and the defined location of the spout 88 may be stored sequentially to define the unloading position.

Referring to FIG. 8, once the unloading position is defined, the touchscreen 138 may illustrate a third view 188 that can include a field map 190 and/or any other information. In addition, the touchscreen 138 may include information related to the fill level 192 of the crop tank 18. Further still, the touchscreen 138 may include a user input that allows for unloading of the crop tank 18. In some instances, when the user input is actuated, an unload process may be initiated. In some examples, in order to initiate the unload process, the user input may be a prompt 194 that is actuated for a minimum threshold amount of time. In some instances, the minimum threshold amount of time may be generally longer than a normal switch activation time. For example, the minimum threshold may be one half second, one second, two seconds, three seconds, or any other amount of time. In some instances, the touchscreen 138 may also include a countdown for the amount of time that the user input is to be actuated to indicate activation of the unload process.

Once the unload process is activated, the unloading tube 80 may move from the stored position to the unload position. When the unloading tube 80 achieves the unloading position, the unloading tube 80 stops motion. After the unloading tube 80 stops, the spout 88 can move from a home position to a predetermined unloading position. After the spout 88 has achieved its unloading position, the harvested crop 16 may be unloaded from the harvester 10 without additional input from the user. As such, the unload process may include the movement of the tube 80 and the exhausting of the harvested crop 16 in a single operation once the unload process activated. However, in other examples, a user may have an option through the HMI 124 and/or the electronic device 126 to allow each process may be accomplished individually.

Figure 9:
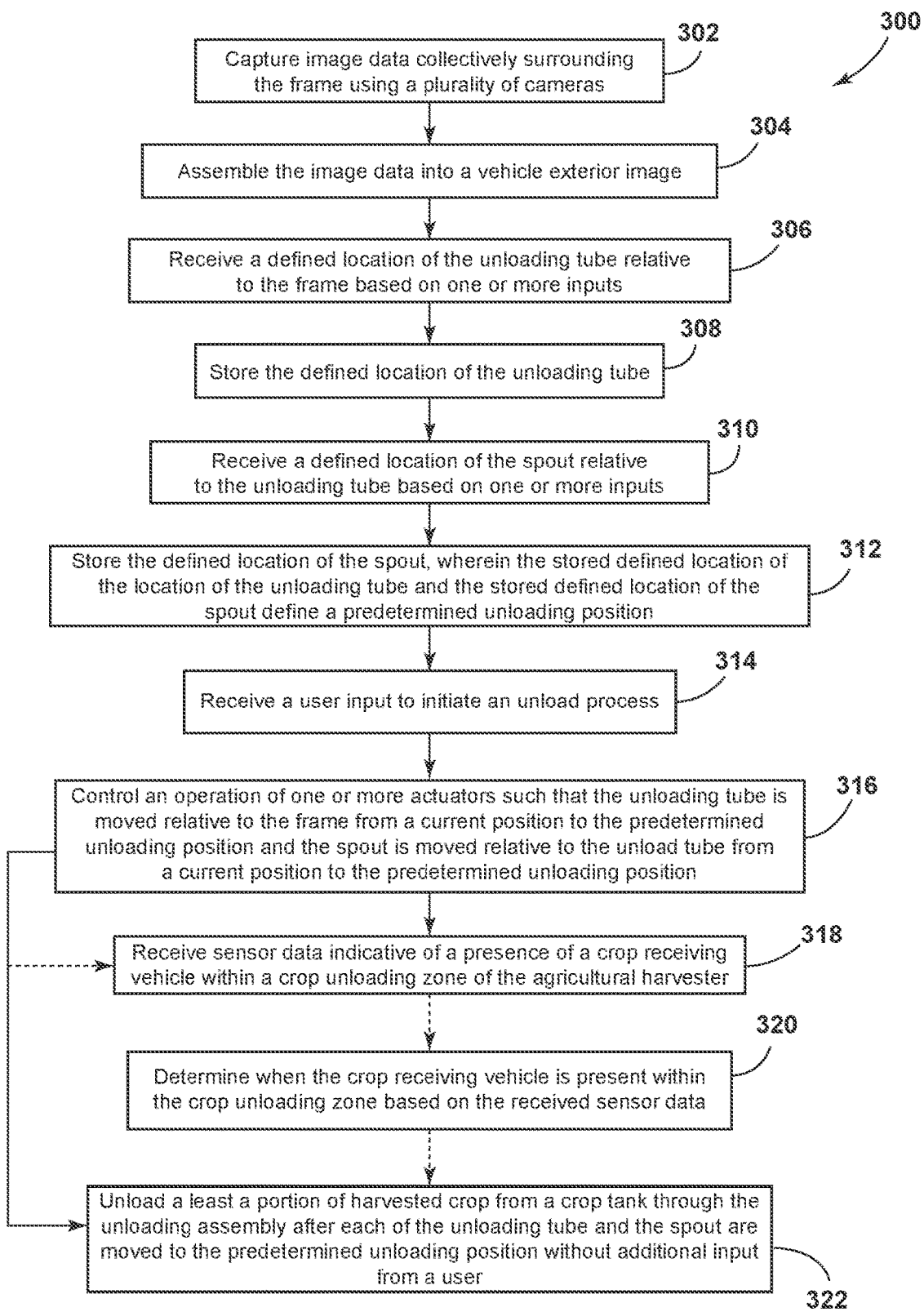
FIG. 9 illustrates a flow diagram for controlling the unloading position of an agricultural harvester in accordance with aspects of the present subject matter.

Referring now to FIG. 9, a flow diagram of some embodiments of a method 500 for controlling an unloading system of an agricultural harvester that includes a frame, an unloading tube configured to move relative to the frame, and a spout configured to move relative to the unloading tube is illustrated in accordance with aspects of the present subject matter. In general, the method 300 will be described herein with reference to the harvester 10 and the system described above with reference to FIGS. 1-8. However, it will be appreciated by those of ordinary skill in the art that the disclosed method 300 may generally be utilized with any suitable agricultural vehicle and/or may be utilized in connection with a system having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302), the method 300 can include capturing image data collectively surrounding the frame using a plurality of cameras. As provided herein, an imaging system may be configured to capture images of an area surrounding the harvester. In some embodiments, the imaging system can include a rearview camera, which is positioned and configured for capturing an image of a view beyond the rear of the harvester. Additionally or alternatively, the imaging system may include a plurality of cameras directed outwardly from the harvester from a plurality of corresponding locations that are configured to collectively capture a view surrounding at least a portion of the view.

At (304), the method 300 can include assembling the image data into an exterior image, wherein the exterior image is displayed on a user interface. When the imaging system is configured as a 360-degree imaging system (or other multiple camera systems), the system may utilize an image processing routine to assemble the respective images from the various cameras into an exterior image, which may be in the form of a panoramic 360-degree view, a bird's-eye view, and/or any other composite image that utilizes data from one or more of the cameras. In some instances, the image processing routine may digitally stitch together the images such that the portions of the adjacent edges of the individual images align to give the appearance of a cohesive whole. Additional processing may be performed to adjust the viewpoint and/or perspective of the images to emulate a single camera.

At (306), the method 300 can include receiving a defined location of the unloading tube relative to the frame based on one or more inputs through the user interface. At (308), the method 300 can include storing the defined location of the unloading tube with a computing system.

At (310), the method 300 can include receiving a defined location of the spout relative to the unloading tube based on one or more inputs through the user interface. At (312), the method 300 can include storing the defined location of the spout with the computing system. The stored defined location of the unloading tube and the stored defined location of the spout define a predetermined unloading position.

At (314), the method 300 can include receiving a user input to initiate an unload process. The user input may be received through the touchscreen and/or any other component. The user input is actuated for a minimum threshold to initiate the unload process.

At (316), the method 300 includes controlling an operation of one or more actuators such that the unloading tube is moved relative to the frame from a current position to the predetermined unloading position and the spout is moved relative to the unload tube from a current position to the predetermined unloading position. In some cases, the unloading tube is moved from the current position to the predetermined unloading position prior to the spout moving from the current position to the predetermined unloading position.

At (318), the method 300 can include receiving sensor data indicative of a presence of a crop receiving vehicle within a crop unloading zone of the agricultural harvester with the computing system. At (320), the method 300 can include determining when the crop receiving vehicle is present within the crop unloading zone based on the received sensor data with the computing system.

At (322), the method 300 can include unloading at least a portion of the harvested crop from a crop tank through the unloading system after each of the unloading tube and the spout are moved to the predetermined unloading position without additional input from a user. As such, the unload process may include the movement of the tube 80 and the exhausting of the harvested crop 16 in a single operation once the unload process activated. In some instances, the unloading of at least a portion of the harvested crop from a crop tank through the unloading system may occur when the crop receiving vehicle is present within the crop unloading zone. However, in some examples, a user may have an option through the HMI 124 and/or the electronic device 126 to allow each process may be accomplished individually.

Figure 10:
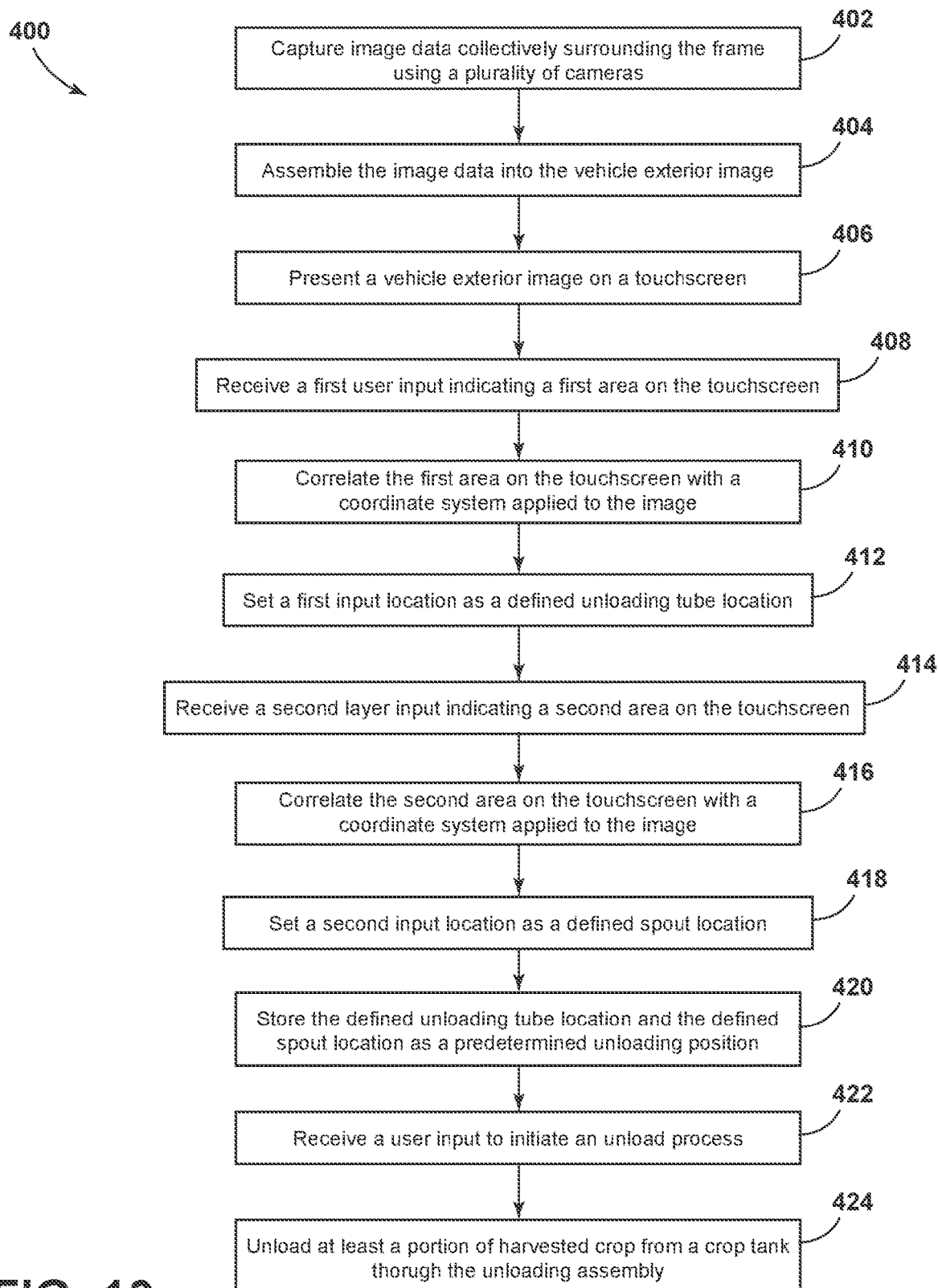
FIG. 10 illustrates a flow diagram for controlling the unloading position of an agricultural harvester in accordance with aspects of the present subject matter.

Referring now to FIG. 10, a flow diagram of some embodiments of a method 500 for controlling an unloading system of an agricultural harvester that includes a frame, an unloading tube configured to move relative to the frame, and a spout configured to move relative to the unloading tube is illustrated in accordance with aspects of the present subject matter. In general, the method 400 will be described herein with reference to the harvester 10 and the system described above with reference to FIGS. 1-8. However, it will be appreciated by those of ordinary skill in the art that the disclosed method 300 may generally be utilized with any suitable agricultural vehicle and/or may be utilized in connection with a system having any other suitable system configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402), the method 400 includes capturing image data collectively surrounding the frame using a plurality of cameras. As provided herein, an imaging system may be configured to capture images of an area surrounding the harvester. In some embodiments, the imaging system can include a rearview camera, which is positioned and configured for capturing an image of a view beyond the rear of the harvester. Additionally or alternatively, the imaging system may include a plurality of cameras directed outwardly from the harvester from a plurality of corresponding locations that are configured to collectively capture a view surrounding at least a portion of the view.

At (404), the method 400 can include assembling the image data into an exterior image, wherein the exterior image is displayed on a user interface. When the imaging system is configured as a 360-degree imaging system (or other multiple camera systems), the system may utilize an image processing routine to assemble the respective images from the various cameras into an exterior image, which may be in the form of a panoramic 360-degree view, a bird's-eye view, and/or any other composite image that utilizes data from one or more of the cameras. In some instances, the image processing routine may digitally stitch together the images such that the portions of the adjacent edges of the individual images align to give the appearance of a cohesive whole. Additional processing may be performed to adjust the viewpoint and/or perspective of the images to emulate a single camera.

At (406), the method 400 can include presenting the exterior image on the touchscreen. The touchscreen may be implemented within an HMI integrated into the harvester and/or within an electronic device that may be remote from the harvester.

At (408), the method 400 can include receiving a first user input indicating a first area on the touchscreen. At (410), the method 400 can include correlating the first area on the touchscreen with a coordinate system applied to the image. At (412), the method 400 can include setting a first input location as a defined unloading tube location.

At (414), the method 400 can include receiving a second user input indicating a second area on the touchscreen. At (416), the method 400 can include correlating the second area on the touchscreen with the coordinate system applied to the image. At (418), the method 400 can include setting a second input location as a defined spout location.

At (420), the method 400 can include storing the defined unloading tube location and the defined spout location as a predetermined unloading position.

At (422), the method 400 can include receiving a user input to initiate an unload process. The user input may be received through the touchscreen and/or any other component. The user input is actuated for a minimum threshold to initiate the unload process.

At (424), the method 400 can include controlling an operation of one or more actuators such that the unloading tube is moved relative to the frame from a current position to the predetermined unloading position and the spout is moved relative to the unload tube from a current position to the predetermined unloading position. In some cases, the unloading tube is moved from the current position to the predetermined unloading position prior to the spout moving from the current position to the predetermined unloading position.

At (426), the method 400 can include unloading at least a portion of the harvested crop from a crop tank through the unloading system after each of the unloading tube and the spout are moved to the predetermined unloading position with the computing system.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling an unloading system of an agricultural harvester, the system comprising:
   a frame;
   a crop unloading system including an unloading tube operably coupled to the frame and a spout operably coupled with the unloading tube, the crop unloading system configured to discharge harvested crop from the agricultural harvester;
   one or more actuators configured to move the crop unloading system relative to the frame;
   a user interface configured to receive one or more inputs;
   a touchscreen configured to receive the one or more inputs; and
   a computing system communicatively coupled to the user interface and the crop unloading system, the computing system configured to:
      provide a first view of the unloading system on the touchscreen to receive one or more inputs related to a defined location of the unloading tube;
      provide a second view of the unloading system on the touchscreen to receive one or more inputs related to a defined location of the spout relative to the unloading tube;
      store a predetermined unloading position based on the defined location of the unloading tube received through the one or more inputs and the defined location of the spout received through the one or more inputs; and
      when an input is actuated for a minimum threshold, control an operation of the one or more actuators such that the unloading system is moved relative to the frame from a current position to the predetermined unloading position.

2. The system of claim 1, wherein the computing system is further configured to:
   activate one or more transfer components to unload at least a portion of harvested crop from a crop tank through the unloading system.

3. The system of claim 1, further comprising:
   a sensor configured to capture data indicative of a presence of a crop receiving vehicle within a crop unloading zone, wherein the computing system is further configured to:
      determine when the crop receiving vehicle is present within the crop unloading zone based on the data captured by the sensor; and
      when it is determined that the crop receiving vehicle is present within the crop unloading zone, unload at least a portion of the harvested crop from a crop tank through the unloading system.

4. The system of claim 1, further comprising:
   an imaging system configured to capture images of an area surrounding the frame.

5. The system of claim 4, wherein the imaging system includes a plurality of cameras, and wherein the computing system is further configured to:
   receive image data from each of the plurality of cameras; and
   assemble the image data into an exterior image as an overhead view of the area surrounding the frame.

6. The system of claim 5, wherein the computing system further determines the defined location of the unloading tube and the defined location of the spout by applying a coordinate system to the exterior image and correlating a location of the one or more inputs on the touchscreen with the coordinate system.

7. The system of claim 1, wherein the one or more actuators are configured to rotate the unloading tube relative to the frame about a vertically extending axis of the agricultural harvester when moving the unloading tube to the predetermined unloading position.

8. The system of claim 1, wherein the one or more actuators are configured to rotate the spout relative to the spout about a horizontally extending axis of the agricultural harvester when moving the spout to the predetermined unloading position.

9. The system of claim 1, wherein the defined location of the unloading tube and the defined location of the spout are stored sequentially.

10. A method for controlling an unloading system of an agricultural harvester, the agricultural harvester including a frame, an unloading tube configured to move relative to the frame, and a spout configured to move relative to the unloading tube, the method comprising:
  receiving, through a user interface, a defined location of the unloading tube relative to the frame based on one or more inputs;
  storing, with a computing system, the defined location of the unloading tube;
  receiving, through the user interface, a defined location of the spout relative to the unloading tube based on one or more inputs;
  storing, with the computing system, the defined location of the spout, wherein the stored defined location of the unloading tube and the stored defined location of the spout define a predetermined unloading position;
  receiving a user input to initiate an unload process, wherein the user input is actuated for a minimum threshold to initiate the unload process, wherein the minimum threshold is displayed on the user input; and
  unloading, with the computing system, at least a portion of a harvested crop from a crop tank through the unloading system after each of the unloading tube and the spout are moved to the predetermined unloading position.

11. The method of claim 10, further comprising:
  controlling, with the computing system, an operation of one or more actuators such that the unloading tube is moved relative to the frame from a current position to the predetermined unloading position and the spout is moved relative to the unload tube from a current position to the predetermined unloading position.

12. The method of claim 11, further comprising:
  capturing image data collectively surrounding the frame using a plurality of cameras; and
  assembling the image data into an exterior image, wherein the exterior image is displayed on the user interface.

13. The method of claim 11, wherein the unloading tube is moved from the current position to the predetermined unloading position prior to the spout moving from the current position to the predetermined unloading position.

14. The method of claim 10, further comprising:
  receiving, with the computing system, sensor data indicative of a presence of a crop receiving vehicle within a crop unloading zone of the agricultural harvester;
  determining, with the computing system, when the crop receiving vehicle is present within the crop unloading zone based on the received sensor data; and
  when the crop receiving vehicle is present within the crop unloading zone, unloading, with the computing system, at least a portion of harvested crop from a crop tank through the unloading system.

15. A method for controlling an unloading system of an agricultural harvester, the agricultural harvester including a frame, an unloading tube configured to move relative to the frame, and a spout configured to move relative to the unloading tube, the method comprising:
  capturing image data of a crop unloading zone positioned on at least one lateral side of the frame and rearwardly of the frame using a plurality of cameras;
  assembling the image data into an exterior image;
  presenting the exterior image on a touchscreen;
  receiving, through a first user input, a first area on the touchscreen;
  correlating the first area on the touchscreen with a coordinate system applied to the image;
  setting a first input location as a defined unloading tube location;
  receiving a second user input indicating a second area on the touchscreen;
  correlating the second area on the touchscreen with the coordinate system applied to the image;
  setting a second input location as a defined spout location subsequent to setting of the first input location; and
  storing the defined unloading tube location and the defined spout location as a predetermined unloading position.

16. The method of claim 15, wherein the exterior image is an overhead image, the method further comprising:
  capturing image data collectively surrounding the frame using a plurality of cameras; and
  assembling the image data into the exterior image.

17. The method of claim 15, wherein the touchscreen is positioned remote from a cab of a harvester, the harvester supporting the unloading system.

* * * * *